Figure 1:
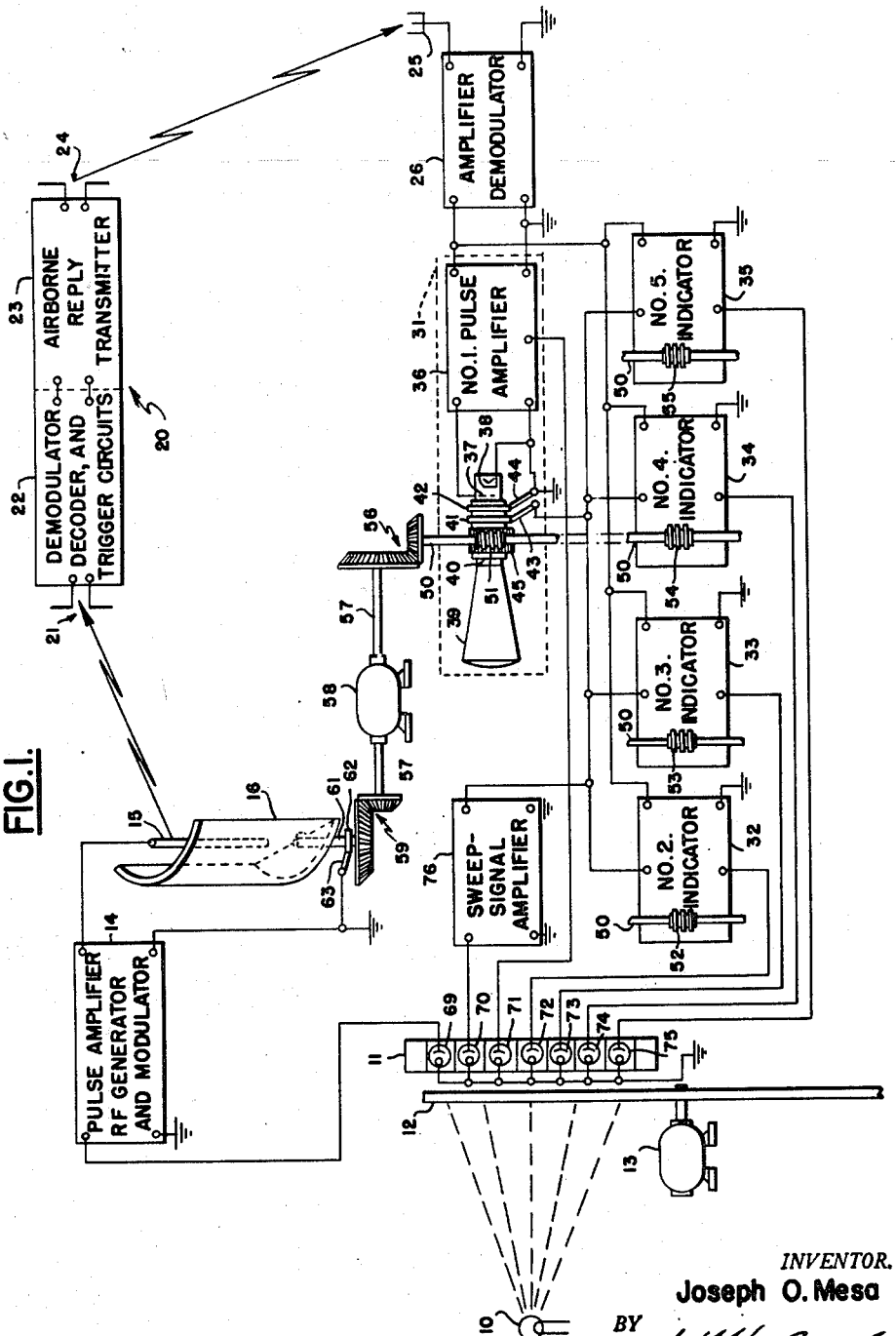

Feb. 20, 1951 J. O. MESA 2,542,825
DISPLAY ARRANGEMENT FOR AIRCRAFT-COORDINATING SYSTEMS
Original Filed Oct. 9, 1946 4 Sheets-Sheet 1

INVENTOR.
Joseph O. Mesa
BY
Attorney

Feb. 20, 1951 J. O. MESA 2,542,825
DISPLAY ARRANGEMENT FOR AIRCRAFT-COORDINATING SYSTEMS
Original Filed Oct. 9, 1946 4 Sheets-Sheet 2

INVENTOR.
Joseph O. Mesa
BY
Attorney

Feb. 20, 1951 J. O. MESA 2,542,825
DISPLAY ARRANGEMENT FOR AIRCRAFT-COORDINATING SYSTEMS
Original Filed Oct. 9, 1946 4 Sheets-Sheet 3

INVENTOR.
Joseph O. Meso
BY
Attorney

Feb. 20, 1951  J. O. MESA  2,542,825
DISPLAY ARRANGEMENT FOR AIRCRAFT-COORDINATING SYSTEMS
Original Filed Oct. 9, 1946  4 Sheets-Sheet 4

INVENTOR.
Joseph O. Mesa
BY
Attorney

UNITED STATES PATENT OFFICE 2,542,825

DISPLAY ARRANGEMENT FOR AIRCRAFT-COORDINATING SYSTEMS

Joseph O. Mesa, Richmond Hill, N. Y., assignor, by mesne assignments, to the United States of America as represented by the Secretary of the Navy Original application October 9, 1946, Serial No. 702,328, now Patent No. 2,524,987, dated October 10, 1950. Divided and this application January 27, 1949, Serial No. 73,154

2 Claims. (Cl. 343—6)

This invention relates to a display arrangement for an aircraft-coordinating system and particularly to a display arrangement for such a system in which position information received from aircraft in flight is classified automatically to indicate which one of a number of altitude strata is occupied by each of the aircraft from which position information is received.

As a result of greatly increased use of air transportation, it is now a common occurrence for large numbers of high-speed aircraft bound in different directions to be flying simultaneously in the same area. The resulting congestion of airborne traffic along the important transportation routes and particularly near airports makes increasingly important the systematic coordination and control of this traffic, which of course necessitates the efficient and continuous collection of information regarding the positions of aircraft in flight. Not only must such a traffic control system function when visual contact among aircraft and between aircraft and the ground is impossible, but also it is highly advantageous that the system be flexible enough to permit each aircraft and each ground station to investigate on its own initiative the traffic situation in its vicinity. Such a system is described in an application Serial No. 617,020, filed September 18, 1945, in the name of Knox McIlwain and assigned to the same assignee as the present invention, now abandoned.

In accordance with this system, the airborne or ground station desiring to investigate the traffic situation utilizes automatic radio equipment to transmit interrogating signals to other stations within range. Responses are received indicative of the position of the replying station, and either the interrogating or the replying signals are coded automatically to give the signals distinguishing characteristics corresponding to one of a number of predetermined altitude strata. The equipment for receiving either the interrogating or the replying signals contains an automatic decoding arrangement for eliminating replies except from those stations located in the altitude stratum of immediate interest to the interrogating station.

Using this system the pilot of an aircraft in flight may determine the positions of all other aircraft in his vicinity and in the same or a neighboring altitude stratum. Likewise a ground station may determine the positions of all aircraft within range in any desired altitude stratum. These positions may be displayed, for example, on the fluorescent screen of a cathode-ray oscilloscope for viewing by the station operator. To facilitate the coordination of airborne traffic, particularly in the vicinity of an airport, the ground station may use a plurality of coded transmitters or a plurality of receivers with differently adjusted decoding circuits to obtain simultaneously a plurality of displays, one for each of a number of altitude strata. Alternatively, aircraft in the several strata may be interrogated by a single transmitter with the use of a rapidly recurring sequence of altitude codes, the responses for each altitude stratum being displayed on a separate surface.

It thus has been proposed that a station for coordinating airborne traffic be equipped with from two to ten or more display surfaces on which an operator or operators may observe the location of aircraft in the vicinity of the station. In accordance with one such proposal the various display surfaces with their respective adjusting circuits are placed alongside each other, so that a different operator may observe each display, or so that one or more operators may pay divided attention to a number of displays. Although display arrangements of this character often are satisfactory for a small aircraft-coordinating station handling relatively light traffic, or for a very large station which requires at least several operators for traffic observation and direction, an unaided control operator of a station of intermediate importance may become overburdened. His duties may include observation and direction of aircraft taxying on the ground, as well as frequent radio-telephonic communication with aircraft in flight. Under these conditions he may not have time to look from one to the other of a number of entirely separate displays each limited to aircraft flying within specified altitude levels.

Nevertheless, the advantages of displays which are readily distinguishable as to altitude may warrant their use, since altitude separation of aircraft according to direction of flight or to landing priority is a recognized principle of air-traffic control. Of course, various methods of coding to permit automatic classification according to altitude may be used. Coding may be accomplished, for example, by distinctive modulation of interrogating wave signals of a single carrier frequency, or by assigning different frequencies to different altitudes. In any case the positions of aircraft are presented on a plurality of display surfaces corresponding to a plurality of altitude strata.

Accordingly, it is an object of the present invention to provide a new and improved display arrangement for an aircraft-coordinating system which substantially avoids one or more of the limitations of the described prior arrangements.

It is also an object of the invention to provide, in an aircraft-coordinating system, a new and improved arrangement for simultaneously displaying the positions of aircraft flying in various altitude strata, in which provisions are made to facilitate distinguishing the altitude stratum occupied by each aircraft.

It is a further object of the invention to provide a new and improved display arrangement for an aircraft-coordinating system in which altitude-classified position information received from aircraft in flight is displayed in perspective to permit easy identification of the altitude stratum occupied by each such aircraft.

In accordance with the invention, a display arrangement, for an aircraft-coordinating system in which position information received from aircraft in flight is classified automatically to indicate which one of a number of altitude strata each such aircraft occupies, comprises a plurality of display surfaces having substantial displacements between the surfaces for effectively displaying representations of the positions of those of the aircraft occupying the respective ones of the altitude strata. The display arrangement also comprises an optical system for viewing all of the display surfaces as if in one field but as separated from each other axially along the optical system to permit identification of the stratum associated with the representation of any aircraft on any of the surfaces.

For a better understanding of the present invention, together with other and further objects thereof, reference is had to the following description taken in connection with the accompanying drawings, and its scope will be pointed out in the appended claims.

Figure 2:
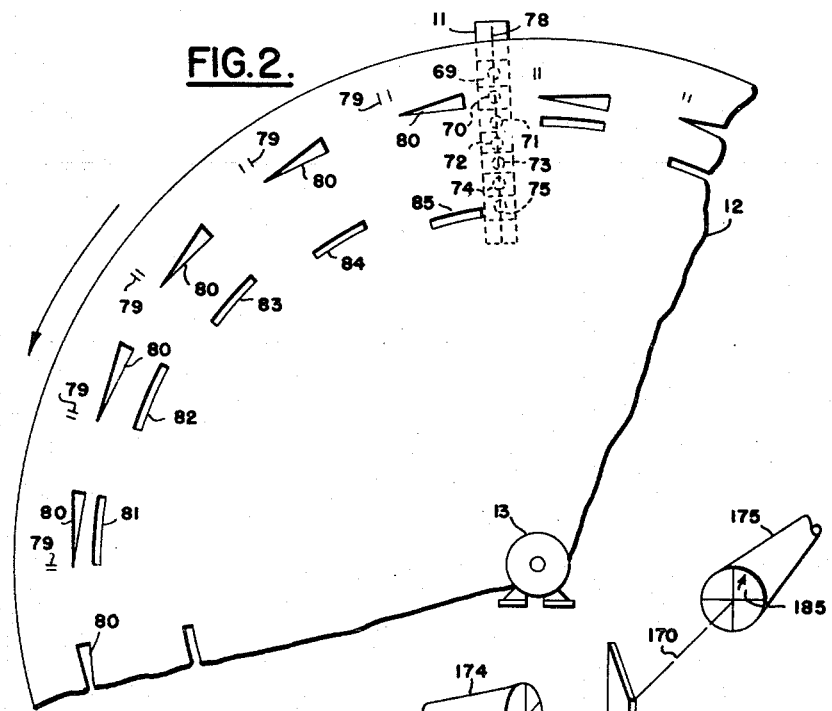
Figure 3:
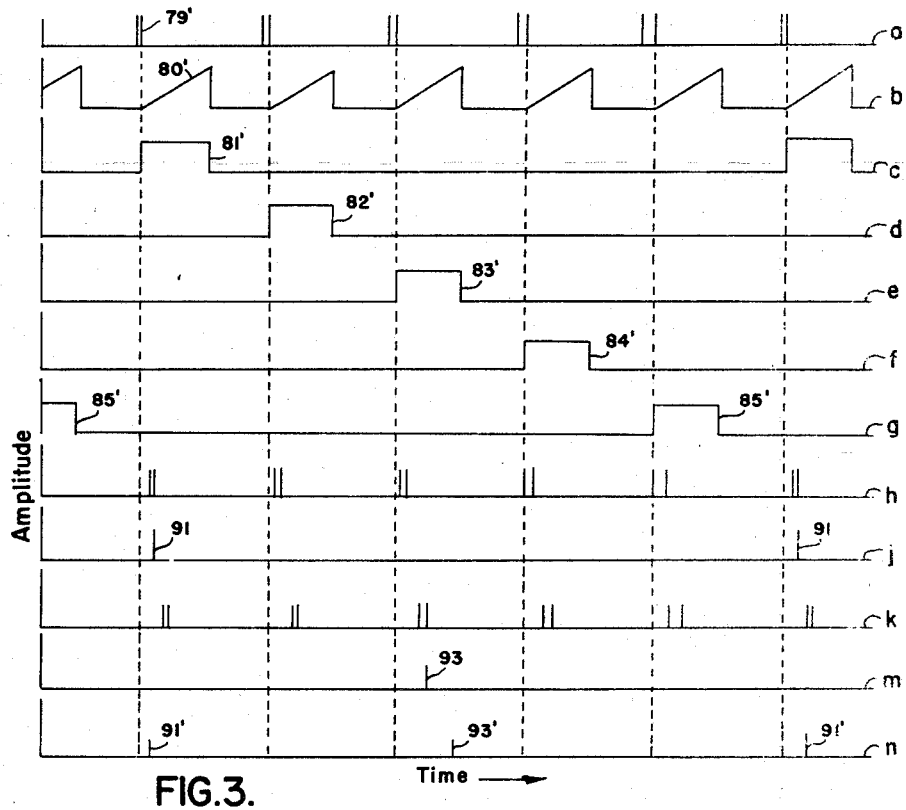
Figure 5:
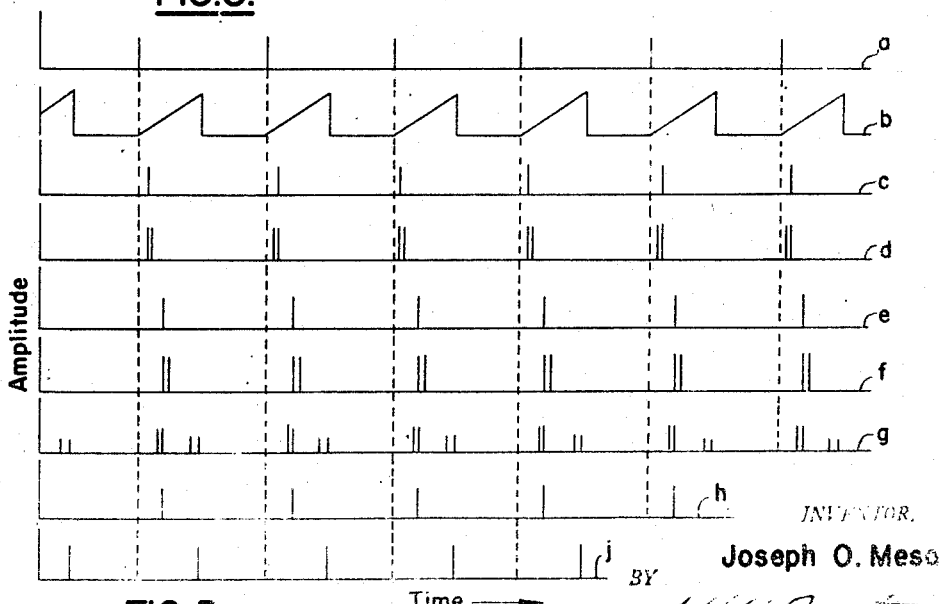
Figure 4:
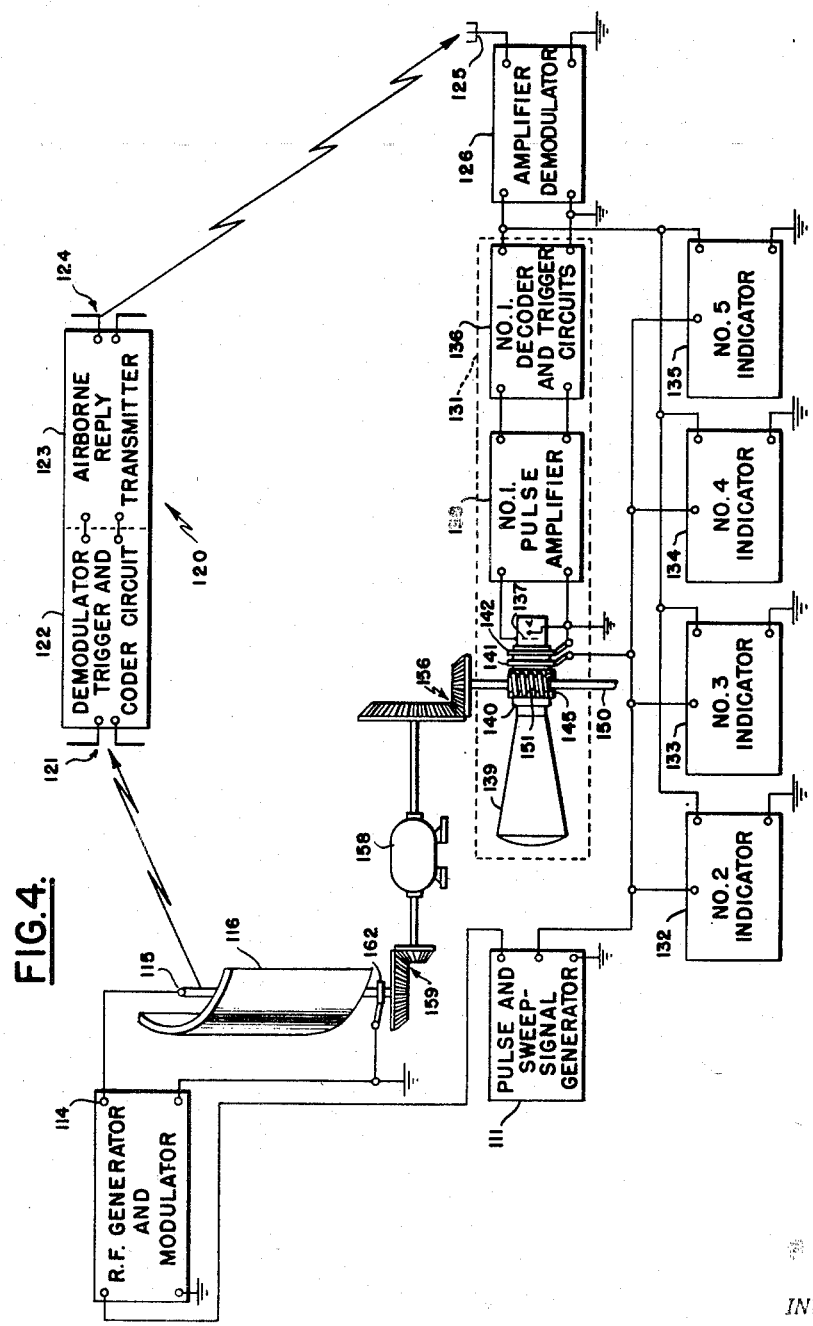

In the drawings, Fig. 1 is a schematic representation of an aircraft-coordinating system, including a plurality of position indicators, to which the present invention conveniently may be applied; Fig. 2 is a partial view of a control disc for use in the arrangement of Fig. 1; Fig. 3 is a graph of the signals present at related times in various portions of the system of Fig. 1 during operation thereof; Fig. 4 is a schematic representation of an alternative aircraft-coordinating system, including a plurality of position indicators, to which the present invention suitably may be applied; Fig. 5 is a graph of the signals present at related times in various portions of the system of Fig. 4 during operation thereof; and Fig. 6 is a perspective view of an arrangement, in accordance with the present invention, of the display devices included in the position indicators of the aircraft-coordinating system of Fig. 1 or Fig. 4.

Referring to Fig. 1 of the drawings, there are illustrated schematically an interrogating station of an aircraft-coordinating system and a representative airborne replying station from which the interrogating station is receiving position information. The transmitter portion of the interrogating station comprises a lamp 10 for providing light adapted to actuate a photocell bank 11. Interposed between the lamp 10 and photocell bank 11 is a signal-control disc 12 fastened to the rotatable shaft of a signal-control motor 13. A connection is made from photocell bank 11 to a transmitter unit 14 including a generator of a radio-frequency carrier signal and a modulator therefor, and the output circuit of unit 14 is connected to a horizontally directional antenna 15 having a conventional rotating reflector structure 16.

Within range of the interrogating transmitter is an airborne station 20 having an omnidirectional receiving antenna 21. The airborne station further comprises a unit 22, including demodulator, decoder, and trigger circuits and having an input circuit coupled to antenna 21 and an output circuit coupled to an airborne reply transmitter 23. An omnidirectional transmitting antenna 24 is provided for the replying transmitter 23.

The interrogating station also includes an omnidirectional receiving antenna 25 and an amplifier-demodulator unit 26 having an input circuit coupled to antenna 25 and output circuits coupled to each of five indicator devices 31—35. The indicators 31—35 correspond respectively to successive altitude strata, identified by the numbers 1-5, and are numbered accordingly. The mean heights of the altitude strata may vary from low to high in the order named. The indicators are identical and only indicator 31 for No. 1 stratum is shown in detail. The leads from unit 26 to indicator 31 are connected to the input circuit of a pulse amplifier 36 for No. 1 altitude stratum, the output circuit of amplifier 36 being coupled to a beam-modulating electrode 37 and a cathode electrode 38 of a cathode-ray device 39. Device 39 is one of a plurality of cathode-ray devices, each indicator having such a device for the corresponding altitude stratum. Rotatable about the neck of cathode-ray device 39 is a yoke 40 containing a beam-deflecting arrangement whose terminals are brought to slip rings 41 and 42, contacted by brushes 43 and 44 respectively.

To provide for rotation of yoke 40 a gear 45 is affixed to the periphery of the yoke. A rotatable driving rod 50 passes in tangential relationship to gear 45 and to similar gears, not shown, in the other four indicators, any suitable mechanical coupling without reversal of sense of rotation being supplied between the portions of the driving rod 50 adjacent each such gear. Rod 50 carries a worm 51 meshing with the gear 45 and also carries similar worms 52—54, similarly operatively placed in the indicators 32—34 respectively. A worm 55, operatively placed in the No. 5 indicator 35, however, constitutes a screw of opposite lead from that of worms 51—54, causing rotation of the deflecting yoke in indicator 35 in the opposite sense. Shaft 50 is connected by means of a bevel gear 56 to another shaft 57, which passes through an azimuth-control motor 58. Another bevel gear 59 on shaft 57 drives a shaft 61 fastened to the rotatable reflector 16. Reflector 16 is grounded through a slip ring 62 on shaft 61 and the brush 63. The seven bevel and worm gears have ratios such that one revolution of reflector 16 occurs during one revolution of yoke 40 and also of each of the yokes in indicators 32—35.

The photocell bank 11 houses seven phototubes, comprising a pulse-generating phototube 69, sweep-signal-generating phototube 70, and five keying phototubes 71—75. One element of each phototube is grounded. The other element of the pulse-generating phototube 69 is connected to a conventional pulse amplifier in transmitter unit 14 and the other element of the sweep-signal-generating phototube 70 is connected to the input circuit of a sweep-signal amplifier 76. The output signal of amplifier 76 is supplied to the rotatable beam-deflecting arrangement in indicator 31 through brush 43, and the other brush 44 is grounded to complete the circuit. The output signal of amplifier 76 also is supplied in the same way to the other indicators 32—35. Keying phototube 71 is connected to a control circuit in the No. 1 pulse amplifier 36. Likewise keying phototubes 72—75 are connected to similar control circuits in the indicators 32—35 respectively.

Fig. 2 shows in greater detail part of the face of signal-control disc 12 and also shows signal-control motor 13. Photocell bank 11 as shown in Fig. 2 is a stationary compartmented housing in the front of which is a very narrow slit-shaped opening 78. Behind slit 78 are placed in separate light-shielding compartments the seven phototubes 69—75 arranged in the order of decreasing radial distance in relation to disc 12. The disc has transparent openings located so that light passing through them and through slit 78 falls on one of the phototubes. Thus, at an extreme radius on disc 12 are narrow, regularly spaced groups of slit-shaped openings 79 for registration with the compartment containing pulse-generating phototube 69. Peripherally aligned with slots 79 are the narrow ends of wedge-shaped openings 80 adapted to permit increasing amounts of light to fall on phototube 70 during their passage in front of slit 78 and thus to generate sweep signals of saw-tooth amplitude. At progressively smaller radial distances from the center of disc 12 are located five keying openings 81—85 for generating a succession of keying signals in phototubes 71—75, respectively. The quadrants of disc 12 are identical and each contains five pairs of coding slits 79, five wedge-shaped openings 80, and five keying openings 81—85.

In the operation of the arrangement of Figs. 1 and 2, motor 13 causes disc 12 to rotate in front of photocell bank 11. Light from lamp 10 passes through coding slits 79, as they come into register with slit 78, and excites phototube 69, which generates coded interrogating pulses for application to the pulse amplifier in transmitter unit 14. In the modulator of unit 14 the amplified pulses modulate the carrier signal generated in that unit. The modulated carrier signal is applied to directional antenna 15, whereby the interrogating station transmits directional, coded interrogating signals to aircraft in flight.

The interrogating signals are received at omni-directional antenna 21 of airborne installation 20. In the unit 22 the received signals are demodulated and then decoded in a manner to be described more particularly hereinafter. Those signals which pass the decoding circuit cause a trigger circuit in unit 22 to develop a triggering pulse. This pulse triggers the reply transmitter 23, thus causing a reply signal in the form of a pulse of carrier-frequency energy to be applied to antenna 24.

The reply signal is received at antenna 25 of the interrogating station and applied to unit 26, where it is amplified, demodulated, and then supplied to the input circuits of the pulse amplifiers in all five indicators 31—35, in one of which a display, indicative of the position of the replying aircraft, appears in a manner to be described hereinafter. To prevent the receiving circuits of units 22 and 26 from responding to the same signals, it is advisable that transmitter units 14 and 23 generate carrier signals of different frequencies, although all interrogating units and all replying units in the system should use carrier frequencies the same as those of units 14 and 23 respectively.

Systems for coordinating the movements of aircraft in flight almost invariably involve division of the air space into a number of altitude strata, each, for example, one thousand feet in height. To effect classification of the position information received from aircraft in flight the interrogating signals may consist of a succession of pairs of pulses, different separations between the individual pulses of each pair being assigned for the mean altitude of each of a number of different altitude strata. This is accomplished by the arrangement of the coding slits 79 in Fig. 2. As these slits pass in front of phototube 69 the spacing between the pulses of successive pairs of pulses increases. A pair of slits of maximum spacing in one quadrant of disc 12 has just passed the phototube as illustrated in Fig. 2, while a pair of slits having minimum spacing in the next quadrant of the disc is approaching the phototube. The resulting pulses are illustrated in the graph of Fig. 3a, where the vertical coordinate represents the amplitude of the pulses. The coded pulses 79' illustrated are graduated from closely spaced pairs corresponding to No. 1 altitude stratum to the most widely spaced pairs corresponding to No. 5 stratum. In the drawings the relative pulse spacing has been exaggerated for clarity of illustration and the scale is too small to permit indication of the duration of an individual pulse.

After the carrier signals, pulse-modulated with the code spacing representing the altitude strata, are radiated by antenna 15, received at antenna 21, and demodulated in unit 22, the coded pulses are sent to the airborne decoder circuit in the latter unit. In one form of decoder circuit the first of a pair of pulses is used to cause the generation of a single pulse in a well-known keyed pulse-generation circuit arrangement which may be called a univibrator. The length of the pulse thus generated is determined by a circuit whose time constant depends upon the position of a barometric device. Thus after an elapsed time depending on the altitude of the aircraft carrying the decoder the pulse ceases. This pulse may be applied to a conventional differentiating circuit to obtain two impulses of opposite polarity, one at the leading and one at the trailing edge of the relatively long pulse generated by the univibrator. The latter impulse is used to place a trigger amplifier in an operative condition for a period of time starting after the elapsed time determined by the altitude of the aircraft and lasting long enough to accommodate the code spacings corresponding to the range of heights included in one altitude stratum. If the second pulse from the interrogating station arrives at the trigger amplifier during this period of time, it is amplified and applied to modulate the carrier signal generated in the reply transmitter 23. Suitable decoder circuits are illustrated in Fig. 6 of the application Serial No. 617,020 referred to above; suitable univibrator and associated circuits are shown in detail in Fig. 4 of the same application.

Operation of the system of Figs. 1 and 2 conveniently may be described further with reference to the graphs of Fig. 3, all of which are on related time scales, using for illustration two separate airborne installations 20, one in No. 1 stratum and rather near the interrogating station, and the other in No. 3 stratum and relatively distant therefrom. Passage of wedge-shaped openings 80 in front of phototube 70 results in the generation of the sweep signals 80' shown in Fig. 3b. Passage of keying openings 81—85 in front of phototubes 71—75 respectively causes the successive generation of keying signals 81'—85' respectively, illustrated in Figs. 3c–3g respectively. The sweep signals are initiated with the transmission of the second pulse of each pair, and the keying signals 81'—85' are each coincident with the sweep signal following the pulses coded for strata Nos. 1–5 respectively. The coded pulses 79' of Fig. 3a are received in the installation 20 in the nearer aircraft after a short time interval, as indicated in Fig. 3h. The decoder circuit in that aircraft is conditioned automatically by an associated barometric device to amplify only the second pulses of only those pairs of pulses having the short spacing corresponding to No. 1 stratum. After receipt of this second pulse, however, the trigger circuit causes the reply transmitter 23 in that aircraft to transmit a single pulse, as illustrated at 91 in Fig. 3j. As shown in Fig. 3k, the same interrogating pulses are received shortly thereafter by the installation 20 in the aircraft in No. 3 stratum, which, however, responds only to those pairs of pulses coded for No. 3 stratum, transmitting reply pulses one of which is illustrated at 93 in Fig. 3m. Fig. 3n illustrates the reply pulses as received at antenna 25 of the interrogating station, pulse 91' being received from the aircraft in No. 1 stratum and pulse 93' from the aircraft in No. 3 stratum.

The keying signals 81'—85' serve to condition for operation the pulse amplifiers of the five indicators in succession. Thus when the replying pulses 91' reach the interrogating station only the No. 1 pulse amplifier 36 is operative due to keying signal 81', while only No. 3 indicator is operative due to keying signal 83' when the pulses 93' arrive from the aircraft in No. 3 stratum. Cathode-ray device 39 in indicator 31 and the similar devices in the indicators 32—35 preferably are adjusted so that, when no sweep signal is applied to their deflecting yokes, the cathode-ray beams are focused on datum points located approximately at the centers of the fluorescent screens or other display arrangements included in the devices. A sweep signal then causes deflections radially outward from these centers. The beams are prevented from producing a visual signal, however, except when the appropriate keying signal permits modulation of the beam.

When the sweep signal 80' is applied to the deflecting yokes, the beams are deflected toward the peripheries of the screens in a direction corresponding to the positions of the deflecting yokes. Since the yokes rotate in synchronism with antenna reflector 16, they may be adjusted so that the azimuthal relation to the interrogating station of the portions of the sky covered by antenna 15 is indicated on each indicator. For example, when the reflector 16 faces north sweep-signal deflections are in an upward direction, while when the reflector 16 has rotated 90 degrees and faces east sweep-signal deflections are in a horizontal angular-direction rotated 90 degrees with reference to the upward direction. In this way the azimuthal information conveyed by the angular position of the beam is received from aircraft which reply only when reflector 16 permits transmission of interrogating signals to aircraft located in the corresponding direction. The reason for the opposite senses of rotation of the yoke in No. 5 indicator 35 and the yokes in the Nos. 1–4 indicators will be pointed out hereinbelow.

The method of indicating range information also is illustrated in Fig. 3. During the propagation of interrogating pulses 79' and replying pulses 91 and 93 deflecting signals 80' of increasing amplitude are applied to the deflecting yokes in the five indicators 31—35. The instantaneous value of one of these sweep signals is proportional to the time elapsed since the transmission of the corresponding interrogating pulse and hence to the range from the interrogating station of the replying aircraft. Thus, as may be seen by comparing Figs. 3b and 3n, the replying signals 91' modulate the beam and so appear on the screen of No. 1 indicator 31 when the beam has been deflected a relatively small distance from the center of the screen, while the replying signals 93' appear on the screen of No. 3 indicator 33 after a much greater deflection of the beam corresponding to the greater distance of the aircraft in No. 3 stratum. Hence representations are formed on the screen of each indicator having, with reference to a datum point centrally located on each screen, angular positions and radial distances corresponding respectively to the azimuth and to the range information received from the aircraft.

If desired, rotation of the direction of sweeping about a datum point on each cathode-ray screen may be obtained by electronic means, using the system of radial scanning synchronous with an effectively rotating antenna disclosed in an application Serial No. 433,173, filed March 3, 1942, now abandoned, in the name of Harold A. Wheeler and assigned to the same assignee as the present invention. Moreover, all of the signals illustrated in Figs. 3a–3g also may be generated by electronic means, using the coding circuit shown in Fig. 4 of the application Serial No. 617,020 referred to above, well-known pulse-forming and sweep-generating circuits, and conventional counting and keying circuits to provide the succession of keying signals illustrated in Figs. 3c–3g. The arrangement of the present invention may be applied to a system providing a plurality of position indicators of the type described regardless of the circuits used to procure the indications.

In Fig. 4 there is illustrated schematically a system similar to that shown in Fig. 1, but in which the coding is accomplished in the airborne installations and decoding is done in the receiver circuits of the interrogating station. Referring to Fig. 4, a pulse and sweep-signal generator 111 consists of a conventional generator of a series of short pulses having substantially rectangular wave shape and a keyed sweep-signal generator of well-known design for generating signals of saw-tooth wave shape starting coincidently with each of the pulses. Generator 111 is coupled to an R. F. generator and modulator 114, the output circuit of which is coupled to a directional antenna 115 having a rotatable reflector 116. Units 111 and 114 and antenna 115 constitute the interrogating portion of an interrogating station which is within range of at last one airborne installation 120.

The airborne installation 120 includes an omnidirectional receiving antenna 121 connected to a unit 122 including demodulator, trigger, and coder circuits. The unit 122 has an output circuit coupled to an airborne reply transmitter 123. An omnidirectional antenna 124 is coupled to the output circuit of the reply transmitter 123.

At the interrogating station an omnidirectional receiving antenna 125 is connected to the input circuit of an amplifier-demodulator unit 126, the output circuit of which, in turn, is coupled to an indicator 131 for No. 1 altitude stratum and to similar indicators 132—135 for strata Nos. 2–5 respectively. The indicator 131 includes No. 1 decoder and trigger circuits 136, a No. 1 pulse amplifier 138, and a control element 137 of a No. 1 cathode-ray device 139. The output circuits of demodulator 126 are coupled to units 136 and 138 arranged in tandem and thence to the control element 137. Similar arrangements are provided in each of the five indicators. The coder circuit of unit 122 and the decoder circuits in each of the five indicators may take the forms shown in Figs. 4 and 6 respectively of the application Serial No. 617,020 referred to above.

The cathode-ray device 139 has a rotatable beam-deflecting arrangement 140 having slip rings 141 and 142 and a peripheral gear 145 affixed thereto. A drive shaft 150 passes in tangential relation to the gear 145 and to similar gears in each of the other indicators and carries worms illustrated by worm 151 meshing with its gear 145. As in the system of Fig. 1 the worm, not shown, associated with the No. 5 indicator 135 has a reversed lead, and the drive shaft 150 is coupled mechanically by means of bevel gears 156 and 159 to the reflector 116 and to a driving motor 158. The slip ring 142 on deflecting yoke 140 is grounded, as is a similar slip ring 162 on the shaft supporting reflector 116. The remaining slip ring 141 on deflecting yoke 140 in indicator 121 and similar slip rings on the yokes in the other indicators are connected to the sweep-signal output circuit of pulse and sweep-signal generator 111.

The operation of the arrangement of Fig. 4 will be described in connection with the graphs of Fig. 5, all of which are on related time scales. The pulse output of pulse and sweep-signal generator 111 is illustrated in Fig. 5a, the vertical height of the pulses indicating their amplitude. The pulses are generated at a regular rate which may correspond to the rate at which the pairs of pulses shown in Fig. 3a are generated. However, the pulses generated by unit 111 are uncoded. Simultaneously with the generation of each pulse a sweep signal of the form indicated in Fig. 5b starts to appear at the proper terminal of unit 111. This sweep signal is applied to the beam-deflecting yokes in all five indicator units 131—135. The pulses appearing at the proper terminal of unit 111 are used to modulate the radio-frequency carrier signals generated in unit 114, and the pulse-modulated carrier is radiated by antenna 115 in the direction determined by reflector 116 to any airborne installations 120 within range of the interrogating station.

Operation of the arrangement of Fig. 4 will be described using as examples the signals that would be present if one airborne installation with a rather close range is present in No. 1 stratum and another airborne installation of relatively great range is present in No. 3 stratum. Considering first the installation 120 in No. 1 stratum, the uncoded interrogating signals are received at its antenna 121 after a time delay dependent upon the distance between the interrogating station and the airborne unit, as illustrated in Fig. 5c. These signals are demodulated in unit 122 and applied to trigger a coder circuit in the same unit. Immediately after receipt of each interrogating pulse the coder circuit generates a pair of pulses having a spacing corresponding to the altitude stratum of the aircraft, in this case, the short spacing assigned to No. 1 stratum. These paired pulses, which are illustrated in Fig. 5d, are applied to modulate the carrier signal generated by airborne reply transmitter 123, and the modulated signals are radiated by antenna 124. In an analogous manner the interrogating signals are received at a still later time by the installation 120 in the more distant aircraft in No. 3 stratum, the received signals being illustrated in Fig. 5e. In this case, however, the reply pulses are spaced more widely in accordance with the code established for No. 3 altitude stratum, this spacing being determined automatically by barometric equipment in the aircraft. The replying pulses from the aircraft in No. 3 stratum are illustrated in Fig. 5f.

After additional elapsed time, corresponding to the distances between each of the two aircraft involved and the interrogating station, the coded reply pulses are received at antenna 125 of the interrogating station. For each interrogating pulse one pair of coded pulses is received from each aircraft in the portion of the sky then covered by directional antenna 115, as shown in Fig. 5g. The No. 1 decoder in unit 136 of indicator 131 eliminates all signals except those coded for the No. 1 altitude stratum. The second pulse of each pair of properly coded pulses, however, is applied to a trigger circuit in unit 136 which forms the series of pulses illustrated in Fig. 5h. The latter pulses are applied to No. 1 pulse amplifier 138 and thence to the cathode-ray beam-modulating electrode 137 of the cathode-ray device 139. Each one of the five indicators is equipped with a decoder circuit to select paired pulses having the spacing corresponding to its respective altitude stratum. Thus decoder and trigger circuits in the No. 3 indicator 133 produce pulses illustrated in Fig. 5j in response to the coded pulses received from the aircraft in No. 3 stratum. The pulses formed by these trigger circuits are amplified in a corresponding pulse amplifier and applied to the control electrode of a corresponding cathode-ray device in No. 3 indicator. Accordingly representations similar to those obtained in the system of Figs. 1–3 are formed on the screens of the five indicators 131—135.

The arrangements of Figs. 1 and 4 each have advantages, which arrangement is used being a matter of standardization as well as of technical preference. For each interrogating signal in the arrangement of Fig. 4 reply signals are received from all strata. To prevent interference between circuits carrying interrogating signals and circuits carrying replying signals it is advisable that the carrier signal generated by interrogating unit 114 be of slightly different frequency from that of the carrier signal generated by reply unit 123.

Both Fig. 1 and Fig. 4 show an interrogating station of an aircraft-coordinating system in which the station transmits directional interrogating signals to aircraft in flight. The station receives in response to those signals from such aircraft within range of the station position information, specifically, information on azimuth and range with reference to the interrogating station, this information being classified automatically to indicate which one of a number of altitude strata each of the replying aircraft occupies. The systems of Fig. 1 and Fig. 4 both include a plurality of cathode-ray devices having a plurality of fluorescent screens included in the devices. Each screen is supplied with position information which is automatically limited to one stratum of the sky surrounding the station and is displayed in the form of a map or plan view indicating azimuthal relation and the range of aircraft in the vicinity, so that the screens respectively display representations of the positions of those of such aircraft occupying the respective ones of the altitude strata.

Fig. 6 shows a display arrangement, according to the present invention, of a plurality of display surfaces such as those associated with the indicators of Fig. 1 or Fig. 4, each of which includes a cathode-ray device. Thus cathode-ray tubes 171, 172, 173, 174, and 175 are included in Fig. 6, and each tube has a display surface on which may be presented a plan position indication of the air craft within range of the interrogating station in altitude strata Nos. 1, 2, 3, 4, and 5 respectively. In a particularly advantageous form of position-indicating arrangement for use in the present invention the display surfaces are fluorescent screens capable of producing indications of high brilliance and long persistence, so that the indications produced for each position of the directional antenna remain visible until the rotating antenna returns to that position. The display surfaces have substantial spatial displacements between each other.

The remainder of Fig. 6 illustrates an optical system for viewing all of the display surfaces as if in one field. The optical system includes an optical axis 170, 170 passing through a viewing position 180 and the display surface of tube 175. For convenience of illustration the optical axis 170 is considered to lie in a horizontal plane. Of course, this optical axis may be subjected to changes in direction at any points therealong merely by placing totally reflecting mirrors on the axis, permitting convenient placement of the cathode-ray device 175 with respect to viewing position 180. The remainder of the display surfaces are positioned off the optical axis 170, the displacement between the display surfaces thus preventing the other display surfaces and associated equipment from obscuring the surface of tube 175. The optical system also includes an individual partially reflecting mirror intersecting optical axis 170 for each of the display surfaces positioned off the optical axis. Thus, partially reflecting mirrors 176, 177, 178, and 179 are provided for the display surfaces of cathode-ray tubes 171, 172, 173, and 174 respectively.

The partially reflecting mirrors shown in Fig. 6 are arranged in vertical planes making 45-degree angles with the vertical plane through optical axis 170. Hence the auxiliary optical axes connecting each of these display surfaces with the principal optical axis 170 are at right angles to the axis 170 and in the horizontal plane including axis 170. However, it will be understood that each of the partially reflecting mirrors may have any of numerous positions, provided that the mirror intersects the axis 170 and that the angle of reflection made with axis 170 equals the angle of incidence between the partially reflecting mirror and the auxiliary optical path to the respective display surface. Each of the display surfaces may be displaced from the horizontal plane including axis 170, provided that the surface faces the axis and that its respective partially reflecting mirror is tilted correspondingly from a vertical plane.

As shown in Fig. 6, the optical distance from viewing position 180 to mirror 176 and thence to the display surface of cathode-ray tube 171 is smaller than the optical distance from position 180 to mirror 177 and thence to the display surface of tube 172. The latter distance in turn is smaller than the length of the optical path from position 180 to the tube 173, and the distances to tubes 174 and 175 likewise are progressively greater. Thus the effective optical distances in the optical system between viewing position 180 and each of the display surfaces are different, and differ sequentially from display tubes 171 to 175. Since these tubes correspond to the first to fifth altitude strata in the order mentioned, the effective optical distances differ sequentially in the altitude sequence of the strata corresponding to the display surfaces.

In the operation of the arrangement of Fig. 6, light from tube 175 passes through each of the mirrors 179, 178, 177, and 176 to the viewing position 180. There is some attenuation of this light due to reflection from the back surfaces of each of the mirrors, so that it is preferable for the display appearing on tube 175 to be adjusted for high brilliance. Part of the light from tube 174 is reflected from the front surface of mirror 179 and then passes along optical axis 170 through the remaining mirrors to the viewing position. Likewise, light from tubes 173 and 172 is reflected by the mirrors 178 and 177 respectively and passes through the optical system in the same way to the viewing position. Finally light from tube 171, after partial reflection at mirror 176, passes directly to position 180 without further attenuation. Thus, the optical system described permits viewing by an observer at position 180 of all five of the display surfaces as if in one field of view. Due, however, to the difference in length of the effective optical paths from the viewing position to each of the display surfaces, the surfaces are viewed as separated from each other axially along the optical system, permitting identification of the stratum associated with the representation of any aircraft on any of the surfaces.

Operation of the arrangement of Fig. 6 may be illustrated by using as examples displays of the positions of the two aircraft assumed to be within range of the interrogating station in the discussions of Figs. 1 and 4. These aircraft are assumed to be in a generally north-northeasterly direction from the interrogating station, and indications of their positions are obtained when the directional antenna of the interrogating station is facing in that direction, at which time the direction of the sweep signal applied to all the display surfaces is about 25 degrees clockwise from the vertical in the upper right-hand quadrant of the circular display surfaces as viewed from position 180. The direction of sweeping of the unmodulated beam over the display surface of the No. 5 tube 175 is shown by dotted line 185. If during continued operation the directional antenna of the interrogating station scans the sky from north through east, south, west, and back to north in the order named, the direction of individual sweeps of the beam in tube 175 changes in a clockwise order, passing in turn through the upper and lower right-hand quadrants and the lower and upper left-hand quadrants of the display surface. As pointed out hereinabove the deflecting yokes on the tubes 171—174 for strata Nos. 1-4 rotate in the opposite sense, that is, counter-clockwise, from the sense of rotation of the yoke on tube 175. During initial adjustments of the system the yokes on all of the tubes are rotated to an adjustment in which their beams sweep upward when the directional antenna faces north. Thus in the present specific example the beams in tubes 171—174 sweep over paths in the upper left-hand quadrants of the display surfaces in a direction about 25 degrees counter-clockwise from the vertical. Upon reflection at their respective mirrors 176—179, however, the sense of rotation of the direction of sweeping, starting from the upward direction, appears to the observer to be reversed. Thus the direction of the sweep signal in the example appears to be about 25 degrees clockwise from the upward direction in all five of the tubes.

In general, each time a reflection occurs the direction of sweeping must be reversed. For example, if a totally reflecting mirror were placed on the optical axis near tube 175 to reflect the image of the tube, then that tube would require deflecting-yoke gearing having the same sense of rotation as that of the other tubes. If any display surface is displaced from the horizontal plane including axis 170, the yoke associated with that display surface must be rotated during initial adjustments by an amount proportional to the angular displacement from the horizontal so that its beam continues to appear to sweep upward when the directional antenna faces north.

The interrogated aircraft, being in the first and third altitude strata, cause representations to appear on the surfaces of tubes 171 and 173, respectively. The signals received from the aircraft in the No. 1 strata are illustrated in Fig. 3n at 91' or in Fig. 5h. This aircraft is relatively near the interrogating station and so dispatches to the station a reply signal which arrives there before the sweep signal of Fig. 3b or Fig. 5b has attained an amplitude sufficient to cause a large deflection of the beam from the central datum point on the screen of tube 171. The display surface of tube 171 is hidden in the view of Fig. 6, but its boundary and horizontal and vertical lines through its central datum point are indicated in dotted lines. The resulting indication is shown on the screen of tube 171 at 181. The reply signal from the aircraft in No. 3 stratum arrives at a later time with respect to the sweep signal, as illustrated in Fig. 3n at 93' or in Fig. 5j, when the sweep signal has attained an amplitude sufficient to reflect the cathode-ray beam almost to the periphery of the tube. This reply signal arrives when the indicator associated with tube 173 is keyed on, using the system of Fig. 1, or arrives with a code which is acceptable only to the indicator circuits associated with tube 173, using the system of Fig. 4. Hence the resulting indication appears on the screen of tube 173 at 183. As seen from viewing position 180, the indications 181 and 183 both appear to be in the upper right-hand quadrant of the field at about 25 degrees from the vertical, thus indicating the same azimuthal relation for the two indications, but with indication 183 much nearer the edge of the field.

It is preferable to align the display surfaces in the optical system so that the centrally located datum points on each surface are substantially in register as viewed from position 180. When this is done, it readily is apparent to the observer that indication 183 represents an aircraft more distant from the station than the aircraft represented by indication 181, but that the two aircraft have the same azimuthal relation to the interrogating station. Furthermore, the observer sees the indication 183 as if at a greater distance from his eyes than the indication 181, thus permitting the two indications to be distinguished easily as regards the altitude strata occupied by the respective aircraft. Of course, the sequence of distances may be varied at will by interchanging the display surfaces or by varying the lengths of the various optical paths in the system. For example, the surface representing the highest stratum may be made to appear nearest to the observer. When there are numerous aircraft within range occupying various altitude strata, the apparent depth separation of the position indications for the various strata very materially aids the observer in determining the distribution of airborne traffic in the area. If desired, the display screens themselves may be given distinctive characteristics, for example, distinctive colors, to permit easy recognition of the surface upon which the observer has focused his attention.

Many modifications of the arrangement of Fig. 6 will occur to the designer confronted with a particular display problem. The proportions of the lengths of the various optical paths to the display surfaces may be varied to enhance the apparent stereoscopic separation of the surfaces to any desired degree. The observer viewing the arrangement of Fig. 6 sees the tube 175 as the most distant and consequently the smallest display surface. Nevertheless, the representation of aircraft vertically above each other in different strata may be made to appear to the observer as aligned by attenuating slightly the sweep-signal voltages in the nearer tubes in proportion to the nearness of the tubes. It also may be pointed out that the range indicated by representations of the type described is a so-called slant range, meaning the length of the path from the interrogating station to the aircraft rather than the projection of this path on a horizontal surface. During usual operations horizontal distances from the interrogating station are so much greater than the maximum altitude involved that this discrepancy in the range indication is quite negligible. However, if desired, the start of the sweep signal applied to a tube representing a higher altitude stratum may be delayed by a time equal to that necessary to receive a reply from the nearest aircraft in that stratum, that is, one directly overhead. If this is not done, there is a small circular area around the datum point of the corresponding display surface which never shows a representation of an aircraft.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

This application is a division of patent application, Serial No. 702,328, filed October 9, 1946, now Patent No. 2,524,987, issued October 10, 1950.

What is claimed is:

1. In a wave-energy display system for indicating the locations relative to a ground station of aircraft operating in a particular altitude zone, a first pulse transmitter operating on a first frequency, a directional antenna rotatable about a vertical axis connected to said pulse transmitter, pulse modulation means connected with said pulse transmitter to control the energization thereof, a first pulse receiver responsive to signals of a second frequency located adjacent said transmitter, coding means connected to said pulse modulator to energize transmitter to radiate pulsed signals corresponding to a particular altitude zone and in a direction determined by the direction of said directional antenna, a second pulse receiver carried by said aircraft responsive to pulse signals from said transmitter, an adjustable decoding means connected with said receiver, altitude responsive means connected with said decoding means to render said decoding means responsive to signals corresponding to the altitude zone occupied by said aircraft, a second pulse transmitter operating on said second frequency carried by said aircraft and connected to said decoding means to radiate a signal in response to coded signals corresponding to the altitude of said plane, and indicator means responsive to the time interval between the transmitted coded signal from said first pulse transmitter and the received response at said first receiver to indicate the range to said aircraft and to the heading of said directional antenna to indicate the direction of said aircraft from said ground station.

2. In an aircraft control system, a ground control station comprising a first pulse transmitter operating on a first predetermined frequency and having a directional antenna rotatable in azimuth, means for energizing said first transmitter to radiate a series of pairs of pulses of predetermined magnitude and of a spacing between said pairs of pulses representing a predetermined altitude zone, a mobile transponder carried by each of said aircraft comprising a first pulse receiver responsive to radiated pairs of pulses from said first pulse transmitter, an adjustable decoder adapted to produce an operating pulse in response to the application thereto of pairs of pulses of a spacing corresponding to the adjustment of said decoder connected to said receiver, altitude-responsive means connected to said decoder to vary its adjustment in accordance with the altitude of the aircraft, a second pulse transmitter responsive to operating pulses from said decoding means to radiate a signal, a second pulse receiver at said ground station responsive to signals radiated by said second pulse transmitter, and indicator means jointly responsive to the heading of said directional antenna to indicate the direction of said aircraft from said ground station and to the time interval between the transmission of a pair of pulses by said first transmitter and the reception of a pulse from said second transmitter by said second pulse receiver to indicate the range to said aircraft.

JOSEPH O. MESA.

REFERENCES CITED

The following references are of record in the file of this patent:

UNITED STATES PATENTS

| Number | Name | Date |
|--------|------|------|
| 2,468,045 | Deloraine | Apr. 26, 1949 |
| 2,480,123 | Deloraine | Aug. 30, 1949 |
| 2,483,097 | McIlwain | Sept. 27, 1949 |